United States Patent [19]
Bartholomew et al.

[11] Patent Number: 6,147,988
[45] Date of Patent: Nov. 14, 2000

[54] IP PACKET SWITCHING IN A TELCO SWITCH

[75] Inventors: Dale L. Bartholomew, Vienna; Robert D. Farris, Sterling, both of Va.

[73] Assignee: Bell Atlantic Network Services, Inc., Arlington, Va.

[21] Appl. No.: 08/958,310

[22] Filed: Oct. 27, 1997

[51] Int. Cl.[7] .................................................. H04Q 11/00
[52] U.S. Cl. ........................................................ 370/352
[58] Field of Search ................................. 370/352, 355, 370/356, 389, 400, 473, 474, 375, 230, 426, 351, 376; 379/220, 229, 230, 207

[56] References Cited

U.S. PATENT DOCUMENTS

| | | | |
|---|---|---|---|
| 4,558,444 | 12/1985 | Kennedy et al. | 370/58 |
| 4,805,166 | 2/1989 | Ardon et al. | 370/54 |
| 4,916,691 | 4/1990 | Goodman | 370/60 |
| 5,226,042 | 7/1993 | Ardon et al. | 370/68 |
| 5,307,413 | 4/1994 | Denzer | 380/49 |
| 5,422,941 | 6/1995 | Hasenauer et al. | 379/207 |
| 5,583,920 | 12/1996 | Wheeler, Jr. | 379/88 |
| 5,590,129 | 12/1996 | Ardon | 370/68 |
| 5,594,789 | 1/1997 | Seazhotz et al. | 379/207 |
| 5,608,786 | 3/1997 | Gordon | 379/100 |
| 5,610,910 | 3/1997 | Focsaneanu et al. | 370/351 |
| 5,631,948 | 5/1997 | Bartholomew et al. | 379/67 |
| 5,661,790 | 8/1997 | Hsu . | |
| 5,708,702 | 1/1998 | De Paul et al. | 379/230 |
| 5,712,903 | 1/1998 | Bartholomew et al. | 379/89 |
| 5,724,355 | 3/1998 | Bruno et al. | 370/401 |
| 5,726,984 | 3/1998 | Kubler et al. | 370/349 |
| 5,742,597 | 4/1998 | Holt et al. | 370/390 |
| 5,838,682 | 11/1998 | Dekelbaum et al. . | |
| 5,850,433 | 12/1998 | Rondeau . | |
| 5,867,495 | 2/1999 | Elliott et al. . | |
| 5,883,891 | 3/1999 | Williams et al. . | |
| 5,889,774 | 3/1999 | Mirashrafi et al. . | |
| 5,923,659 | 7/1999 | Curry et al. . | |

*Primary Examiner*—Chau Nguyen
*Assistant Examiner*—Forood Boortalary
*Attorney, Agent, or Firm*—McDermott, Will & Emery

[57] ABSTRACT

An assembly comprising a program controlled switch and (IP) Module providing signal compression and decompression and packet assembly and disassembly (PAD). The arrangement provides compression and packetizing of digitized voice and data signals between the conventional switch line interface units and the switch fabric, and/or between the line interface units and the time slot interchange in the interface module. Voice channel signals which have been digitized to 64 Kb/s D0 signals are packetized and packet switched to improve the efficiency of the program controlled switch assembly and also provide convenient Internet access via direct connection to ISP routers.

22 Claims, 5 Drawing Sheets

IP PACKET SWITCHING IN A TELCO SWITCH

TECHNICAL FIELD

The present invention relates to a telecommunications network and more particularly relates to a public switched telecommunications network (PSTN) which provides IP (Internet Protocol) switching using program controlled telephone company (Telco) switches in a manner that provides an improved efficiency use of the bandwidth through-put of such switches along with convenient Internet access.

ACRONYMS

The written description uses a large number of acronyms to refer to various services, messages and system components. Although generally known, use of several of these acronyms is not strictly standardized in the art. For purposes of this discussion, acronyms therefore will be defined as follows:

5ESS AT&T brand program controlled switch
AIN Advanced Intelligent Network
CCIS Common Channel Interoffice Signaling
CCS Common Channel Signaling
CO Central Office
CPE Customer Premises Equipment
CSU Channel Service Unit
DS0 Digital Signal Level 0
DS1 Digital Signal Level 1
DS2 Digital Signal Level 2
DS3 Digital Signal Level 3
DS4 Digital Signal Level 4
DTMF Dual Tone Multifrequency
FT3 Fractional T3
I/O Input/Output
IP Internet Protocol
ISCP Integrated Service Control Point
ISDN Integrated Services Digital Network
OC Optical Carrier
PAD Packet Assembler and Disassembler
PAM Pulse Amplitude Modulation
PBX Private Branch Exchange
PCM Pulse Code Modulation
POTS Plain Old Telephone Service
SCP Service Control Point
SLIC Subscribers Line Interface Circuit
SP Signaling Point
SS7 Signaling System 7
SSP Service Switching Point
STP Signaling Transfer Point
T1 Digital transmission link with capacity of 1.544 Mb/s
TDM Time Division Multiplexing
TSI Time Slot Interchange
X.25 Packet switching protocol

BACKGROUND

Public switched telephone networks in the United States utilize digital transmission systems, commonly known as digital carrier systems. The current nature of such systems is a result of historical development. Digital carrier technology was initially deployed to support trunks between metropolitan central offices or COs (1962), and then in the feeder plant connecting the user to the CO (1973). Since the early 1980s, digital multiplex technology has become directly available to end users in the form of "T1" private lines, and lately as "fractional T1" private lines. ISDN may be considered a companion digital technology applicable to the distribution plant.

Initially, carrier technology was intimately connected with digital voice transmission and PCM (pulse code modulation) methods. With newer non-PCM voice digitization schemes, and the extensive commercial applications of T1 in the high-speed environment, a description of digital carrier systems no longer needs to be subordinated as a mere feature of PCM. However, the peculiarities these digital facilities inherited from their voice ancestry cannot be avoided. It is therefore desirable to deal with the multiplexing schemes employed in T1, restrictions on the user signal imposed by those schemes, typical CPE and carrier equipment, schemes for higher digital rates, and evolving transmission approaches for broadband ISDN.

In the early days of telecommunication, a medium such as copper wire carried a single information channel. Because of economic reasons, both in terms of construction costs and in terms of materials, new ways of packing multiple channels onto a single physical link were needed. The resulting system is referred to as a carrier system, or simply a carrier. Carrier systems may be analog or digital. Analog systems are decreasing in importance, and are now a small fraction of the total number of carrier systems in the public switched network.

The first digital system introduced into the public network was the so-called "T-carrier" system, which utilized twisted pair wire. Digital signals are now transmitted from one location to another by facilities using a multitude of media, including paired cable, coaxial cable, radio, optical fibers, and satellite. A carrier system consists of a transmission component, a user interface component, and a user termination equipment component.

The transmission component is a transmission system carrying multiple channels, which in turn entails multiplexer equipment and a transmission link. T-carriers in a strict telephonic sense, are copper-based digital facilities that carry 24, 96, 672, or 4032 simultaneous PCM-coded voice or voice band data channels, operating at 64 kb/s each (the T1, T2, T3, and T4 systems, respectively). In reality, many carrier systems today are based on fiber transmission. An alternate nomenclature used in describing generic digital carrier systems is DS1, DS2, DS3, and DS4, where DS stands for digital signal. In particular, "DS" refers to the coding format used to transmit the information over the carrier system. Carrier termination equipment includes telephone company (Telco) equipment such as channel banks, transcoder, and digital cross-connect systems; and CPE, such as T1 multiplexers and PBXs (private branch exchanges). Generally, CPE termination equipment must be interfaced to the carrier system via a channel service unit (CSU). T-carrier systems use time division multiplexing (TDM).

The traditional TDM hierarchy is described as DS level 0 through DS level 4. The 0 to 4 kHz nominal voiceband channels are first converted to a digital streams by PCM analog-to-digital techniques, and then multiplexed onto higher bit streams. Each of the individual digitized 64 Kb/s channels is referred to as a DS0 level. In the United States, the traditional digital hierarchy uses 1.544 Mb/s for 24 channels, also called a digroup (for digital group), 3.152 Mb/s for 48 channels, 6.312 Mb/s for 96 channels, 44.736 Mb/s for 672 channels, and 274.176 Mb/s for 4032 channels. As stated, these are commonly called T1, T2, T3, and T4, respectively. These digital streams produced by channel banks and other multiplex equipment are independent of the target transmission media; in fact, in an end-to-end circuit, many different types of media may be encountered.

The output of a T1 multiplexer or a channel bank at the DS1 level may be placed on copper facilities, which are designated as T1 systems; the output of a channel bank at the DS2 level may be placed on copper facilities, designated as T2; the output of a DS3 system may be placed on a fiber optic facility, designated FT3. Thus, a T1 system must use a DS1 signal format; but a DS1 signal need not use a T1 facility.

The rates corresponding to the TDM hierarchy were initially derived based on the information carrying capacity of copper wires and the spacing of manholes where repeaters could be located.

Referring to FIG. 1 there is shown a simplified block diagram of a typical electronic program controlled switch which may be used as signal point (SP) or signal switching point (SSP) type switching offices in public switched telephone networks operated by telephone companies (Telco's). As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequncy (DTMF) detectors. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of operations of the switching office. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A common channel interoffice switching (CCIS) terminal 73 and an associated data unit 71 provide a signaling link between the administrative module processor 61 and an STP of the SS7 signaling network, for facilitating call processing signal communications with other central offices (COs) and with one or more of the SCPs and/or the ISCP 17.

As illustrated in FIG. 1, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Referring to the interface modules 51, a number of these are provided in a typical program controlled telecommunications network switch, such as 5ESS switches manufactured by AT&T, and equivalent switches of other manufacturers. The devices labeled as "units" are normally line or interface cards. These connect to module control and TSI (time slot interchange or time division multiplexed switch) shown in FIG. 1. Those in turn are interconnected to each other through what may be called a higher level time division multiplexed switch shown at 57. The line and trunk interface units connect to POTS (plain old telephone service) or ISDN (Integrated service digital network) lines. The trunk units connect to T1 or higher capacity lines or trunks.

On the back or right side of these units in FIG. 1 the signals comprise digital variations of 64 K/s time slot signaling. In effect this imposes units or slots of 64 K/s as the minimum bandwidth and it is not ordinarily possible to get below this 64 K/s as the unit of bandwidth. The 64 K/s derives from the use of T1 digital carrier. As previously discussed, the T1 digital carrier system is based on digitizing a 4000 Hz signal by sampling at an 8000 times per second rate to obtain 8 bits per sample or 64,000 bits per channel. The resulting PAM (pulse amplitude modulated) signal is encoded in the channel bank and merged with 23 other voice channels to form the 24 DO, DS1 1.544 mb/s T1 carrier. If one subscriber needs 4 K/s for a good voice quality circuit using compression, the other 60 K/s of that D0 channel is unused. If a T1 line is tied up with a conversation at 64 K/s bandwidth is being wasted because the largest amount of that 64 K/s bandwidth is not being used.

DISCLOSURE OF THE INVENTION

OBJECTS OF THE INVENTION

It is an object of the present invention to provide a system and methodology for improving the efficiency of bandwidth usage in the digital switching in program controlled switches in a public switched telecommunications network.

It is another object of the invention to accomplish such improvement without the necessity for modifying the switch operation of the existing elements of the conventional program controlled switches.

It is still another feature of the invention to accomplish the foregoing objects while simultaneously providing to the current program controlled switches in the PSTN an Internet protocol (IP) facility which permits convenient Internet access.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to one preferred mode of implementing the invention there is provided an enhanced switching system which utilizes a conventional program controlled switch of the type now used in central offices. The existing switch is provided with peripheral equipment in the form of relatively low cost Internet Protocol (IP) Modules connected between the existing switch interface units (such as line cards) and the existing high level time multiplexed switch. The added peripheral, which is here referred to as an IP Module, provides duplex compression/decompression and packet assembly and disassembly.

In operation according to one preferred embodiment, incoming signals which are bound for destinations that require switching in the time multiplexed higher level switch fabric are diverted to the IP module. The IP module compresses these signals, performs a PAD function, and delivers the compressed high rate packet signals to the higher level switch. The compressed traffic signals are packet switched in the switch fabric and delivered by that switch to the downstream interface module of the switching system. The signal leaves the interface unit of the interface module as an IP transported packet signal for its final destination. Because the signal is already an IP packet signal it can be connected to an ISP router to provide convenient Internet access. Signals destined for 64 K/s lines are directed by the switch to the downstream IP module and delivered to the downstream line unit as a 64 K/s signal.

According to another embodiment of the invention compression/decompression and PAD functions may be performed between the line units and the TSI. In this embodiment of the invention it becomes feasible to handle virtually all voice circuit switching in a packet format.

BEST MODE FOR CARRYING OUT THE INVENTION

Figure 1:
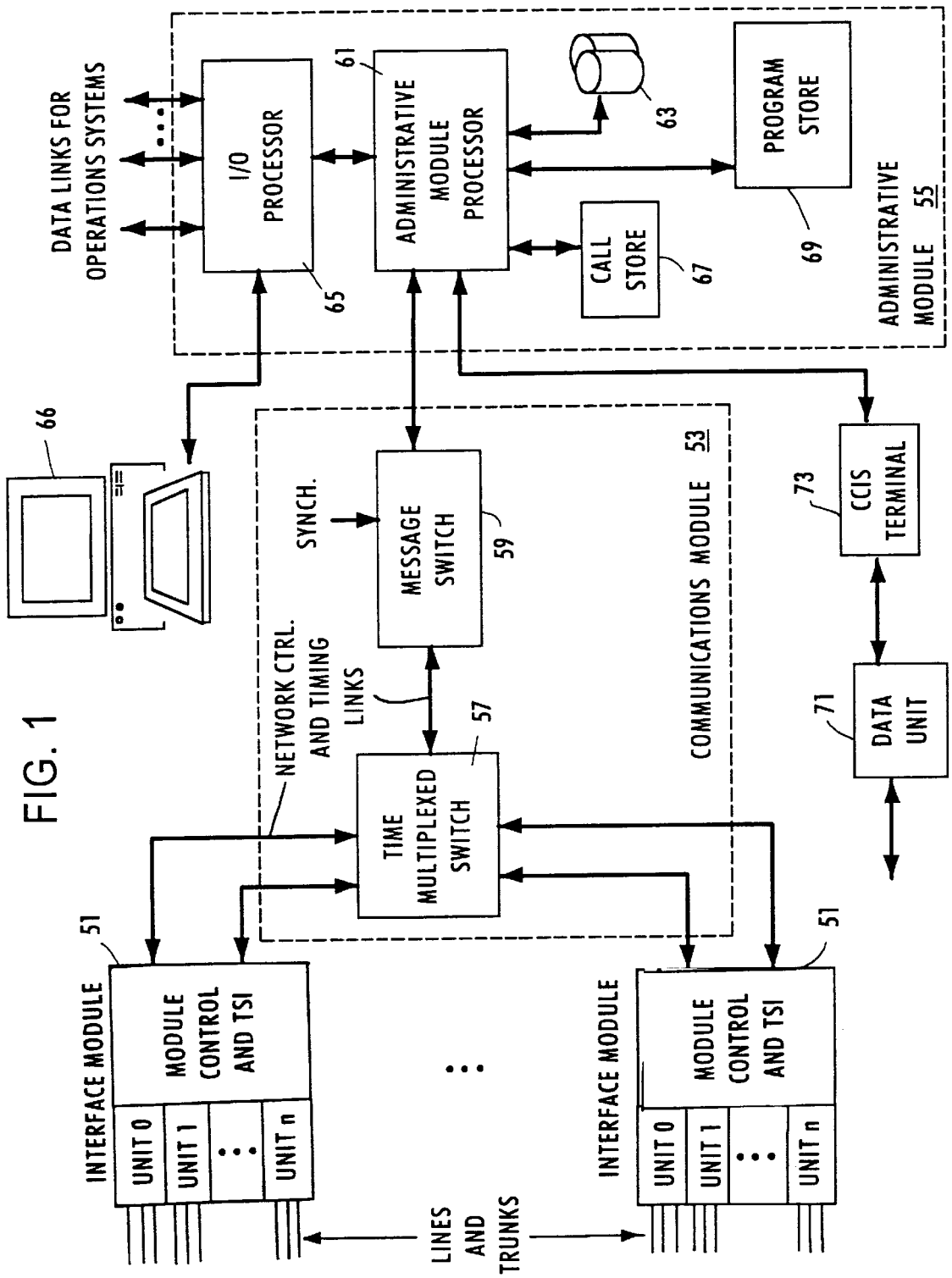
FIG. 1 is a simplified block diagram of a typical electronic program controlled switch which may be used as signal point (SP) or signal switching point (SSP) type switching offices in public switched telephone networks.
Figure 2:
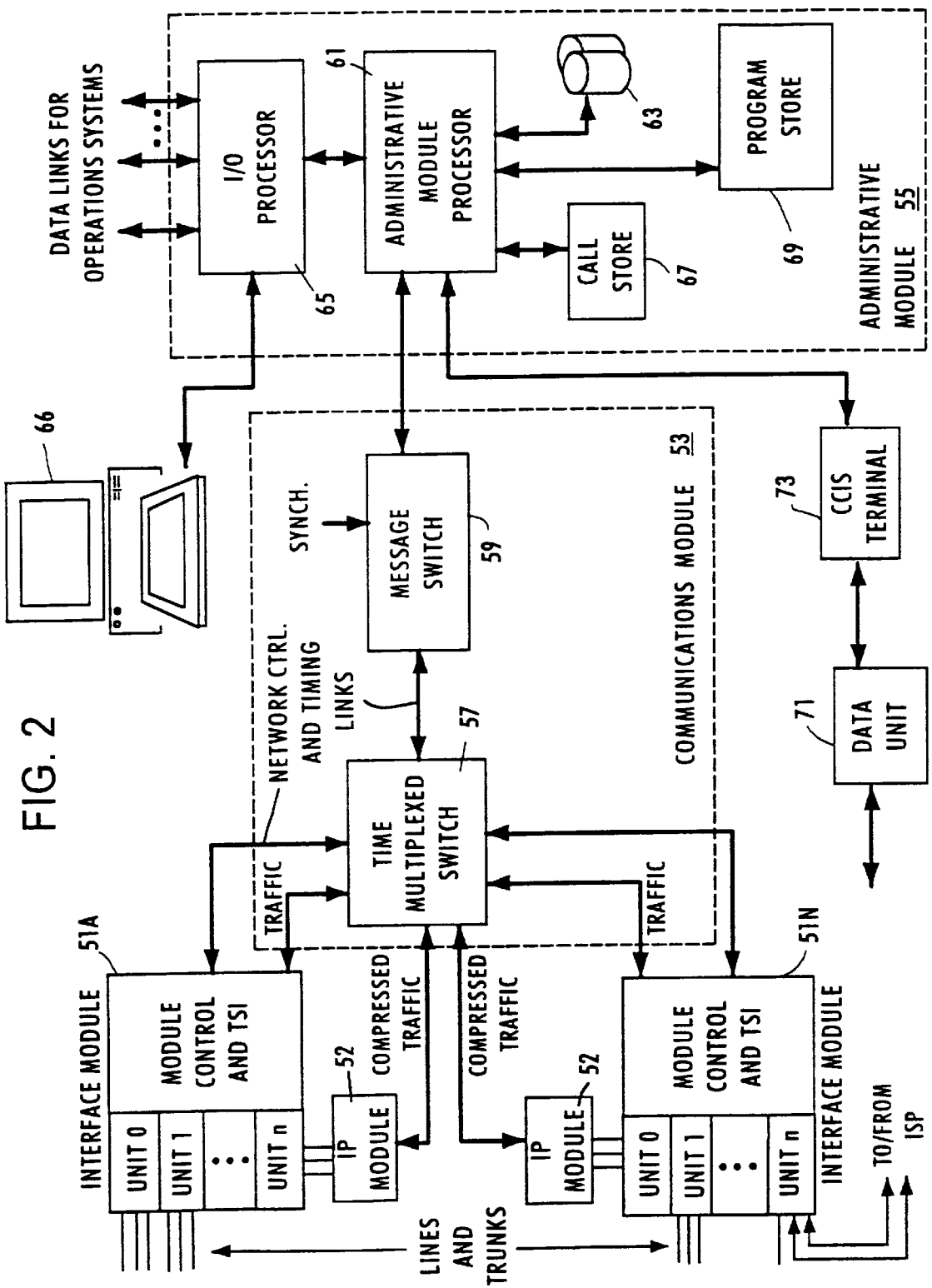
FIG. 2 is a block diagram of a switching system configured according to one preferred embodiment of the invention.

Referring to FIG. 2 there is shown a program controlled switch generally similar to the one shown in FIG. 1. The switch may be used as a signal point (SP) or signal switching point (SSP) type switching office in public switched telephone networks. The switch includes interface modules 51A–N (only two of which are shown), a communications module 53 and an administrative module 55. The SSP-CO provides switched voice grade telephone services and packet switched data service such as X.25 and ISDN.

The interface modules 51 each include a number of interface units 0 to n. First ports of the interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN.

Each interface module 51 includes, in addition to the noted interface units, a duplex microprocessor based module controller and a duplex time slot interchange, referred to as a TSI in the drawing coupled to appropriate ports on the interface units. Digital words representative of voice information are transferred in two directions between interface units via the time slot interchange (intramodule call connections) or transmitted in two directions through the network control and timing links to the time multiplexed switch 57 and thence to another interface module (intermodule call connection).

The time multiplexed switch 57 may consist of a single switch fabric capable of time division multiplexed routing of packets representing both voice and data. Alternatively, the switch 57 may comprise separate switch modules for time division multiplexed routing of the voice words and the data packets.

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of operations of the switching office. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A common channel interoffice switching (CCIS) terminal 73 and an associated data unit 71 provide a signaling link between the administrative module processor 61 and an STP of the SS7 signaling network, for facilitating call processing signal communications with other central offices (COs) and with one or more SCPs and/or ISCPs.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

The interface modules 51A–51N are respectively connected to IP modules 52A–52N. As shown, these connections use the line or trunk ports of the interface units. The connection of the IP module to the interface module, such as 51A, may be made through a trunk interface unit such as interface unit n, via a standard T1 or higher link. Similarly, IP module 52N is connected to the interface module 51N via the trunk interface unit 0 by a standard T1 or higher link. The interface module 51A does a time slot interchange type switching of intramodule signals feeding a standard 64 Kb/s DS1 onto a T1 link to the IP module 52A. The IP module performs compression and decompression and a PAD function to produce IP packet to the higher level multiplexed switch fabric at 57. This may be fed to the time multiplexed switch 57 by standard T1 or preferably higher facility (SLIC or OC).

The fast packet signal output from the IP module to the time multiplexed switch 57 has undergone a high degree of compression and is switched at the higher rate. While voice quality signals may involve 4 or 8 K/s per call, the higher level time multiplexed switch 57 is handling many more calls than with the conventional switch arrangement shown in FIG. 1, by way of example. Once the signal has been raised to the high packet rate it is not necessary for it to go back down other than for delivery to the called party or destination.

Where the signal coming in to a line/trunk interface unit is analog, such as a subscriber loop, the interface unit performs duplex analog to digital conversion and produces a digital 64 Kb/s output to the initial time slot interchange switch TSI. Where the incoming signal is digital the interface unit provides a digital output which is 64 Kb/s or a multiple of that rate, depending on the nature of the incoming signal.

It will be understood that not all traffic is handled through the IP module in this manner according to this embodiment of the invention. Intramodule calls undergo time slot interchange switching in the TSI switch in the interface module 51A, and are delivered to an exit interface unit in that same module without leaving the interface module. These intramodule calls are not delivered to the IP module and do not undergo IP packet processing. However a significant overall improvement is realized by virtue of the calls which can be processed via such high rate IP packet processing. There is a significant reduction in the number of 64 Kb/s slots in the traffic handled in the higher level time multiplexed switch.

In addition to the foregoing it is another feature of the invention that an ISP can be duplex connected via a standard trunk direct to an interface unit, such as the unit n in the lower group of interface units in the interface module 51N. This provides convenient and efficient Internet access. The translation to IP processing in the IP module 52 thus not only provides improved efficiency for the time multiplexed switching but, because Internet protocol is used in the IP module, facilitates connection to the Internet. The signal to the ISP may go directly to the ISP router rather than to the conventional ISP modem banks.

Figure 3:
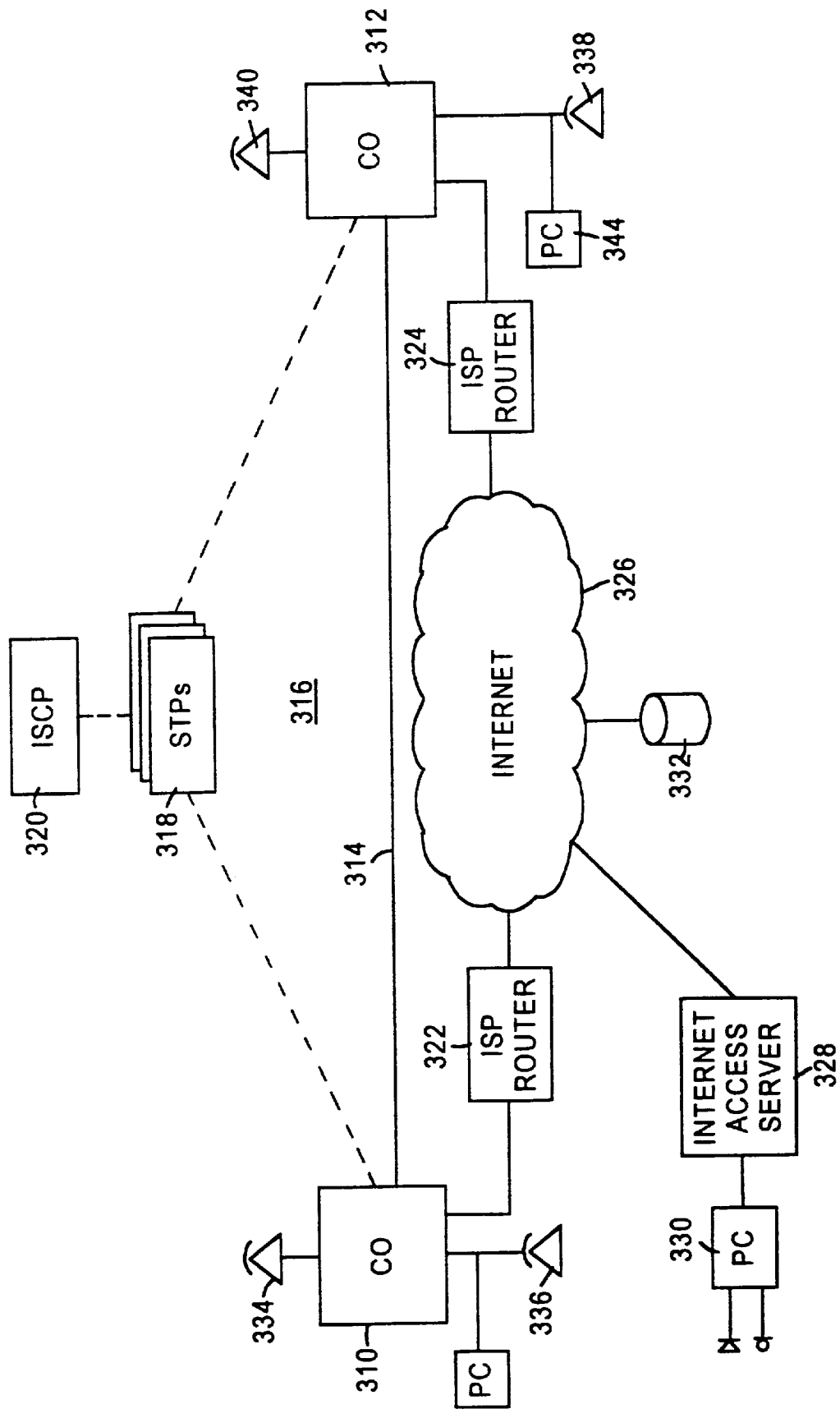
FIG. 3 is a high level block diagram of a preferred embodiment of a telecommunication network system for implementing the invention.

This is illustrated in the high level diagram of a preferred embodiment of a system for implementing the invention which is shown in FIG. 3. Referring to that figure there is shown a telecommunication network represented by a pair of central offices 310 and 312 connected by an illustrative trunk 314. The telecommunications network is provided with an AIN (advanced intelligent network) common channel interoffice signaling (CCIS) system 316. The CCIS system is represented by the STPs 318 and ISCP 320. The central offices are SSP capable and include program controlled switches which are also IP capable. That is, the central offices include switches of the type shown in FIG. 2, including IP modules.

The central offices 310 and 312 are respectively connected to ISP routers 322 and 324 via T1 or higher links. The ISP routers are connected to the Internet 326. The Internet is also connected to various Internet Access Servers 328. The Internet Access Servers provide voice or data connection to users such as represented by the voice capable computer shown at 330. A disc storage 332 provides Internet storage for routing and addressing. The central offices provide connection to telephone subscribers represented by telephone terminals 334, 336, 338, and 340. The same subscribers may also have computers 342 and 344 served over the same local loops.

Figure 4:
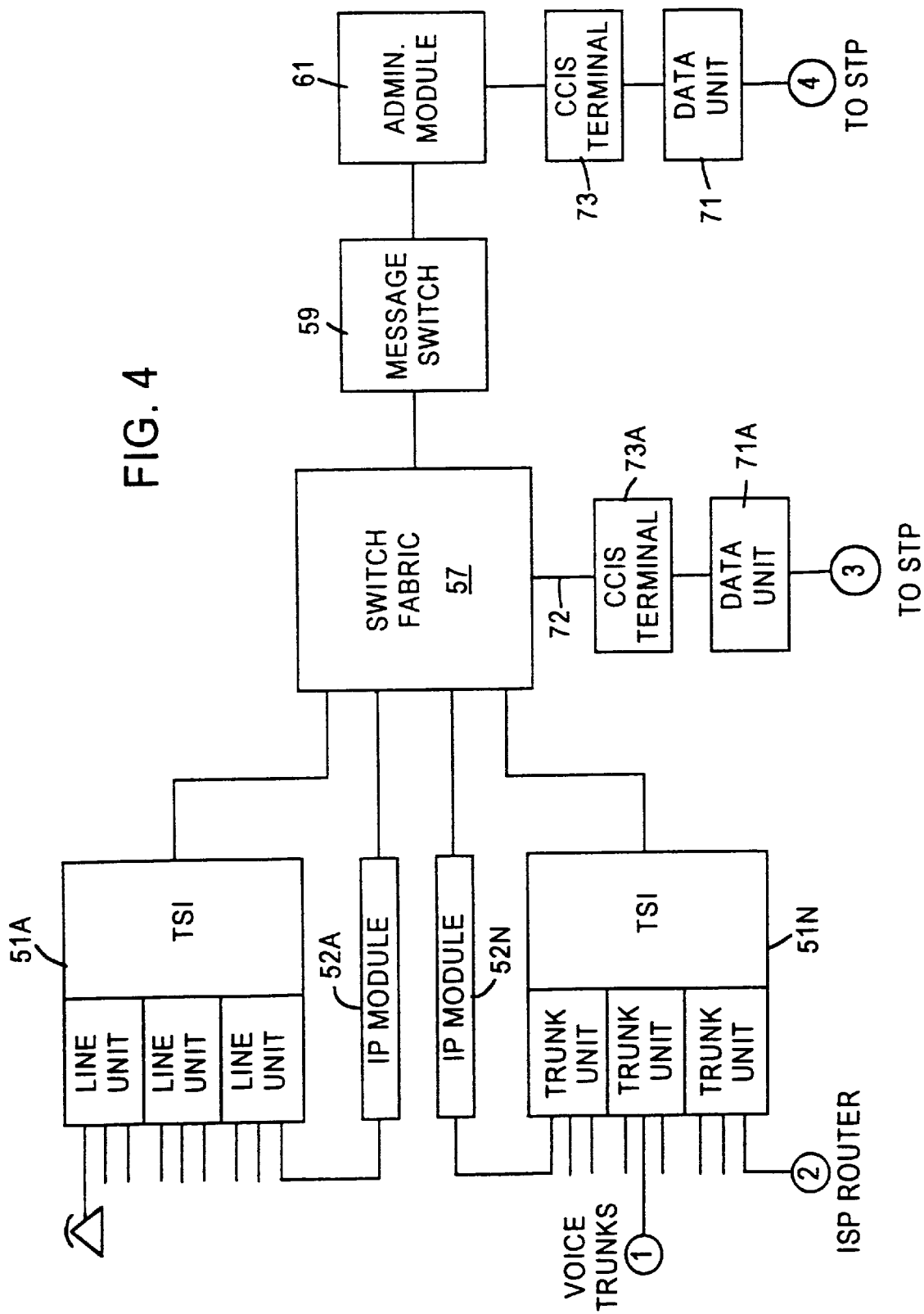
FIG. 4 is a high level block diagram of another embodiment of an improved telecommunication network according to the invention.

Referring to FIG. 4 there is shown a simplified block diagram of another preferred embodiment of the invention. The system shown in FIG. 4 is generally similar to that shown in FIG. 2 with similar reference numerals referring to similar elements. According to the embodiment of FIG. 4 the system is provided with an additional connection to the higher level switch fabric shown at 57. Thus there is seen a connection 72 to a CCIS terminal 73A generally similar to the CCIS terminal 73. This in turn is connected to a data unit 71A generally similar to the data unit 71. The connection 72 provides a packet switched port for compressed SS7 voice or data signals such as are provided in the communication networks shown and described in the common assignee's U.S. Pat. No. 5,631,948, issued May 20, 1997 to Dale L. Bartholomew and Robert D. Farris. That patent is incorporated by reference herein in its entirety. According to this feature of the present invention the signals transported over the SS7 network according to the Farris et al. application are transported via the data unit 71, CCIS terminal 73, administrative module 61, message switch 59, switch fabric 57, CCIS terminal 73A, and data unit 71A back to the SS7 network via an STP.

Pursuant to this embodiment of the invention the augmented central office switching system is capable of handling four different types of signals. These may comprise (1) normal compressed voice over the voice trunks, (2) compressed Internet Protocol (IP) signals carrying voice over the Internet, (3) compressed SS7 signals carrying voice or data over the Internet or within the telephone network, and (4) conventional SS7 signaling. The various enumerated signal types are indicated in FIG. 4 by the circled numerals. The IP signals to the ISP router indicated at 2 need not be processed through the downstream IP module 52N to output 64 K/s signals to the trunk interface to the ISP router. The higher rate signals may instead be transmitted from the switch 57 via the interface module 51N for handling at the IP rate.

Figure 5:
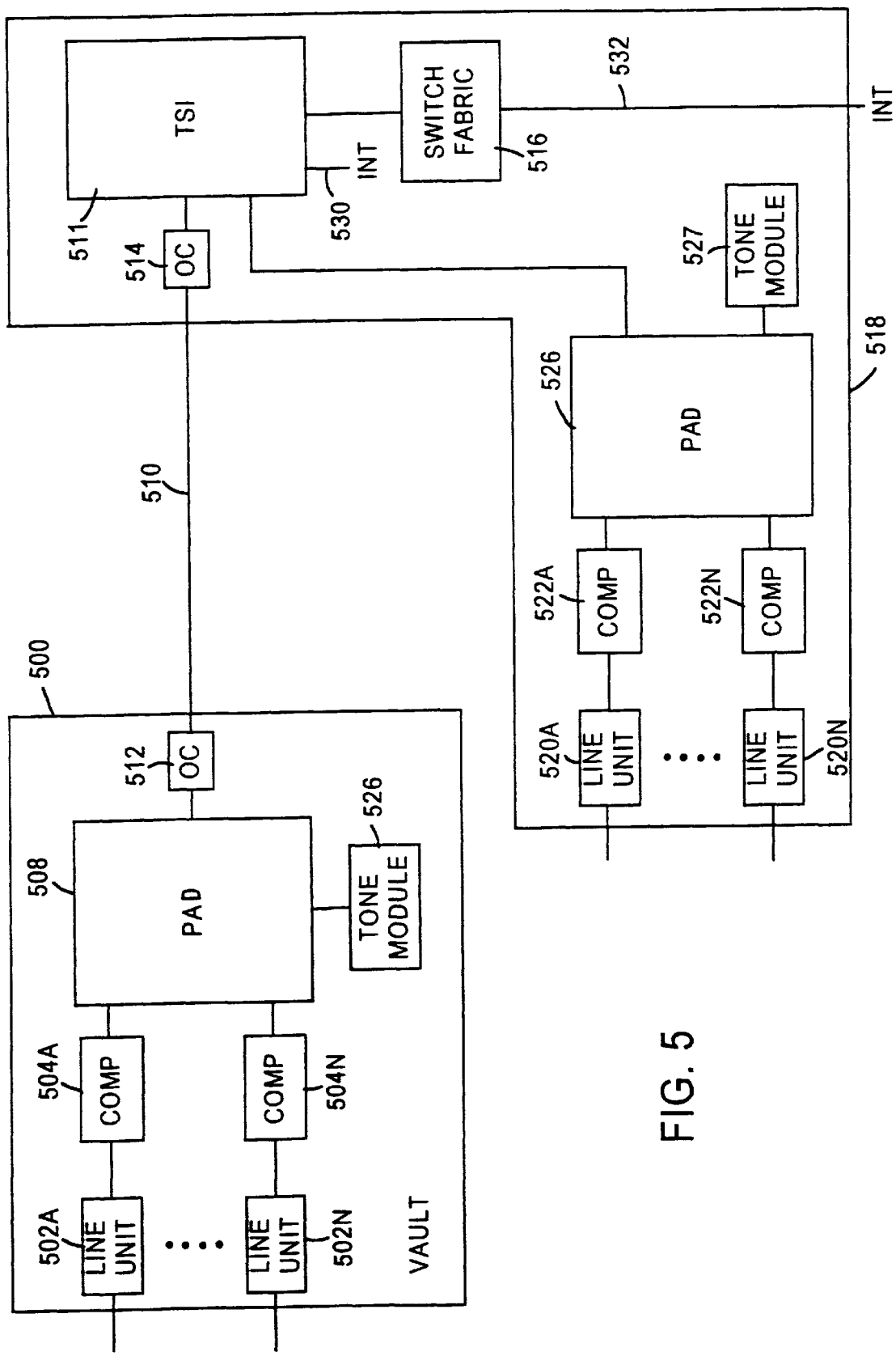
FIG. 5 is a block diagram showing the interface side of a program controlled switch arranged according to still another embodiment of the invention.

Referring to FIG. 5 there is shown a simplified block diagram of yet another preferred embodiment of the invention adapted to provide expanded flexibility and functionality to a public switched telephone network. Referring to that figure there is shown an arrangement wherein the time slot interchange (TSI) and module control of the interface modules shown in FIGS. 2, 3, and 4 of the invention are separated from the line unit or cards which are conventionally mounted at a main frame. This arrangement makes it possible to place the main frame and line units, and the compression/decompression and PAD functions in a vault or other off-CO site. FIG. 5 illustrates a vault 500 containing a series of line cards 502A–N. These are similar to the line units previously described with respect to FIGS. 1–4.

Connected to the line units or cards are compressor/decompressor units 504A–N and packet assembler and disassembler (PAD) 508. The compressors may use a suitable compression algorithm, such as CELP or VSELP, or the like. The PAD may comprise a conventional packet assembler disassembler having the capability to route the assembled IP packets. The assembled packets are delivered to a suitable link 510, which may conveniently comprise copper, coaxial cable, or optical fiber coupled via OC interfaces 512 and 514. The link 510 may serve as a SLIC (subscriber's line interface circuit). The OC 514 connects to the TSI 511, which may be located at a central office. Depending upon the capacity of the PAD, one PAD may serve more than one central office.

The PAD which assembles the IP packets routes those packets and can handle intra-PAD routing to effect an intra-PAD switching function between line units in the vault or other off-CO site. PAD to PAD and PAD to the higher level switch fabric switching may be handled in the TSI, which in this embodiment provides not only TSI switching but also preliminary packet switching. Connection between PADs may also be provided for inter-PAD switching in the vault. With the ability to provide PADs of substantial capacity and/or the ability to provide multiple interconnected PADs in a vault, this feature of the invention enables a high capacity of relatively fast switching in the vault. The load on the central office switch is thereby reduced at the same time that the capacity of the coordinated switching system is increased.

While the line unite, compressor/decompressors, and PAD discussed thus far are separate from the TSI 511 and its associated higher level switch fabric 516, the TSI will normally handle multiple such assemblages, and it is not necessary that all such assemblages be vault or off-CO site located. Thus FIG. 5 shows a second such assemblage 518 which may be located at the CO. This assemblage comprises line units 520A–N, compressor/decompressor units 522A–N, IP units, and PAD 526. The PAD 526 is connected to the TSI 511.

According to this embodiment of the invention it is feasible to handle all or virtually all D0s via packet signals, thereby significantly improving the efficiency of bandwidth usage through the switching system. Tone modules may be provided off of the PADs, as shown at 526 and 527, whereby it is possible to transmit busy and the like signals from the vault or PAD site. This removes still additional burden from the switch itself. Also, the embodiment of FIG. 5 makes it possible to provide direct connection to ISP Internet routers from the TSI, as shown at 530. This makes it possible to remove from the switch fabric a significant burden represented by the load imposed by Internet users. The ISP offer of Internet access for a flat monthly fee has resulted in Internet users who currently maintain a virtually continuous Internet presence. Internet connectivity from the switch fabric 516 may also be provided.

Although several preferred embodiments of the invention have been described in detail above, it should be clear that the present invention is capable of numerous modifications as would be apparent to one of ordinary skill in the art. Such modifications fall within the purview of the appended claims.

What is claimed is:

1. A program controlled switch for use in a central office of a switched telecommunication network, the program controlled switch comprising:

a plurality of interface modules, each interface module comprising:
   (a) a plurality of line or trunk interface units, each interface unit having a line or trunk port for connection to one or more lines or trunks of the network and a digital synchronous time slot port, and
   (b) a synchronous time slot interchanger coupled to the digital synchronous time slot ports of the interface units for routing digital information to and from the interface units;

a programmed administrative module for controlling the operations of the program controlled switch;

a communications module including a synchronous switch fabric connected between the time slot interchangers of the interface modules for exchanging digital information therebetween and connected between the time slot interchangers of the interface modules and the administrative module; and a packetizing module coupled between at least one of the interface units of each of the interface modules and the synchronous switch fabric, said packetizing module including a duplex compression/decompression and packet assembly/disassembly unit for providing a plurality of compressed two-way packet communications using time slots transported via the synchronous switch fabric.

2. A program controlled switch as in claim 1, wherein at least one of the packetizing modules connects to a line or trunk port of an interface unit.

3. A program controlled switch as in claim 1, wherein at least one of said packetizing modules is an Internet Protocol module.

4. A program controlled switch as in claim 3, wherein at least one of the interface units of an interface module coupled to the Internet Protocol module provides a packet data interface for connection of a link to an Internet Protocol data network.

5. A program controlled switch, for use in a switched telecommunication network, comprising:

a plurality of interface modules, each interface module comprising a plurality of line or trunk interface units, each interface unit having a line or trunk port for connection to one or more lines or trunks of the network and a synchronous digital time slot port;

a synchronous digital time slot interchange switch fabric connected to the synchronous digital time slot ports of a plurality of the interface units;

a programmed administrative module coupled to the switch fabric for controlling the operations of the program controlled switch; and a plurality of packetizing modules coupled between predetermined interface units and the synchronous digital time slot interchange switch fabric, each of said packetizing modules comprising a duplex compression/decompression and packet assembly/disassembly unit for providing a plurality of compressed two-way packet communications via the synchronous digital time slot interchange switch fabric.

6. A program controlled switch as in claim 5, wherein at least one of the packetizing modules connects to a trunk port of an interface unit.

7. A program controlled switch as in claim 5, wherein at least one of the packetizing modules connects to the synchronous digital time slot ports of a plurality of the interface units.

8. A program controlled switch as in claim 5, wherein the switch fabric comprises time slot interchangers associated with the interface modules and a time-multiplexed switch coupled between the time slot interchangers.

9. A program controlled switch as in claim 8, wherein at least two of the packetizing modules are coupled between trunk ports of predetermined interface units and the time-multiplexed switch.

10. A program controlled switch as in claim 5, wherein at least one of said packetizing modules is an Internet Protocol module.

11. A program controlled switch as in claim 10, wherein at least one of the interface units of an interface module coupled to the Internet Protocol module provides a packet data interface for connection of a link to an Internet Protocol data network.

12. A program controlled switch as in claim 5, further comprising packet links between a plurality of said packetizing modules for routing packets therebetween.

13. A switched telecommunication network, comprising a plurality of program controlled switching systems interconnected by trunks, for providing switched communication services for a plurality of subscriber lines, at least one of the program controlled switching systems comprising:

(a) a plurality of interface modules, each interface module comprising a plurality of line or trunk interface units, each interface unit having a synchronous digital time slot port and having a line or trunk port for connection to one or more the subscriber lines or the trunks;

(b) a synchronous digital time slot interchange switch fabric connected to the synchronous digital time slot ports of a plurality of the interface units;

(c) a programmed administrative module coupled to the switch fabric for controlling the operations of the program controlled switch; and (d) a plurality of packetizing modules coupled between predetermined interface units and the synchronous digital time slot interchange switch fabric, said packetizing modules comprising duplex compression/decompression and packet assembly/disassembly units, for each providing a plurality two-way packet communications via the synchronous digital time slot interchange switch fabric.

14. A switched telecommunication network as in claim 13, wherein at least one of the packetizing modules connects to a trunk port of an interface unit.

15. A switched telecommunication network as in claim 13, wherein at least one of the packetizing modules connects to the synchronous digital time slot ports of a plurality of the interface units.

16. A switched telecommunication network as in claim 13, wherein the switch fabric comprises time slot interchangers associated with each of the interface modules and a time-multiplexed switch coupled between the time slot interchangers.

17. A switched telecommunication network as in claim 16, wherein at least two of the packetizing modules are coupled between trunk ports of predetermined interface units and the time-multiplexed switch.

18. A switched telecommunication network as in claim 13, wherein at least one of said packetizing modules is an Internet Protocol module.

19. A switched telecommunication network as in claim 18, wherein at least one of the interface units of an interface module coupled to the Internet Protocol module provides a packet data interface for connection of a link to an Internet Protocol data network.

20. A switched telecommunication network as in claim 13, further comprising packet links between a plurality of said packetizing modules for routing packets therebetween.

21. A switched telecommunication network as in claim 13, wherein at least one of said packetizing modules and a group of line and trunk interface units to which it connects are physically located remote from the synchronous digital time slot interchange switch fabric and the programmed administrative module.

22. A switched telecommunication network as in claim 21, wherein said at least one of said packetizing modules and the group of line and trunk interface units to which it connects are physically located in a remote vault.

* * * * *